(12) United States Patent
Carpenter et al.

(10) Patent No.: US 9,390,481 B2
(45) Date of Patent: Jul. 12, 2016

(54) ENHANCING CONTENT APPEARANCE

(71) Applicant: Google Inc., Mountain View, CA (US)

(72) Inventors: Thor Carpenter, Snoqualmie, WA (US);
Anil Kokaram, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 306 days.

(21) Appl. No.: 13/907,890

(22) Filed: Jun. 1, 2013

(65) Prior Publication Data

US 2014/0328548 A1 Nov. 6, 2014

Related U.S. Application Data

(60) Provisional application No. 61/819,590, filed on May 5, 2013.

(51) Int. Cl.
*G06K 9/40* (2006.01)
*G06T 5/00* (2006.01)

(52) U.S. Cl.
CPC ....... *G06T 5/007* (2013.01); *G06T 2207/10016* (2013.01); *G06T 2207/20144* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 7,447,374 B1 | 11/2008 | Reid | |
| 8,213,052 B2 | 7/2012 | Wang | |
| 2003/0012414 A1 | 1/2003 | Luo | |
| 2007/0080975 A1* | 4/2007 | Yamashita | G09G 5/04 345/591 |
| 2010/0189357 A1 | 7/2010 | Robin | |
| 2010/0302272 A1* | 12/2010 | Reid | G06K 9/00234 345/591 |
| 2011/0051991 A1* | 3/2011 | Neuman | G06T 7/0097 382/100 |
| 2011/0262039 A1 | 10/2011 | Du | |
| 2012/0045133 A1 | 2/2012 | Tada | |
| 2012/0250988 A1 | 10/2012 | Peng et al. | |
| 2012/0274724 A1 | 11/2012 | Cross et al. | |

OTHER PUBLICATIONS

European Patent Office; International Search Report, PCT/US14/36691; dated Aug. 4, 2014; 5 pages.
International Bureau of WIPO, International Report on Patentability for International Application No. PCT/US2014/036691, Nov. 10, 2015, 8 pages.

* cited by examiner

*Primary Examiner* — Stephen R Koziol
*Assistant Examiner* — Amandeep Saini
(74) *Attorney, Agent, or Firm* — IP Spring

(57) ABSTRACT

Implementations generally relate to enhancing content appearance. In some implementations, a method includes receiving an image, selecting a reference object in the image. The method also includes determining one or more image parameter adjustments based on the selected reference object, and applying the one or more image parameter adjustments to the entire image.

20 Claims, 4 Drawing Sheets

ENHANCING CONTENT APPEARANCE

CROSS REFERENCE TO RELATED APPLICATIONS

This application claims priority to Provisional application No. 61/819,590 entitled "ENHANCING CONTENT APPEARANCE," filed May 5, 2013, which is hereby incorporated. by reference as if set forth in full in this application for all purposes.

BACKGROUND

In image or video applications, it is often desirable to improve the appearance of content in photos and videos. Numerous image processing techniques exist to visually enhance content, but these techniques typically require manual supervision to get desired results. Furthermore, these techniques require user knowledge of image enhancing to get such desired results. This is especially true if more dramatic changes to the image are being made.

SUMMARY

Implementations generally relate to enhancing content appearance. In some implementations, a method includes receiving an image, selecting a reference object in the image. The method also includes determining one or more image parameter adjustments based on the selected reference object, and applying the one or more image parameter adjustments to the entire image.

With further regard to the method, in some implementations, the reference object is a face. In some implementations, the selecting of the reference object includes determining a foreground and a background of the image, and selecting the reference object from the foreground. In some implementations, where the reference object is a face, the one or more image parameter adjustments meet predetermined face criteria. In some implementations, where the reference object is a face, the one or more image parameter adjustments meet predetermined face criteria, and the predetermined face criteria is based on other images of other faces. In some implementations, where the reference object is a face, the one or more image parameter adjustments meet predetermined face criteria, and the predetermined face criteria is based on other images of the same face. In some implementations, the one or more image parameter adjustments include adjustments to one or more of gamma, contrast, and brightness. In some implementations, the one or more image parameter adjustments include adjustments to one or more white balance parameters. In some implementations, the method further includes applying the one or more image parameter adjustments to an entire frame or frames of a video stream.

In some implementations, a method includes receiving an image, and selecting a reference object in the image, where the reference object is a face. In some implementations, to select the reference object, the method further includes determining a foreground and a background of the image, and selecting the reference object from the foreground. The method further includes determining one or more image parameter adjustments based on the selected reference object, where the one or more image parameter adjustments meet predetermined face criteria, where the predetermined face criteria is based on other images of other faces, and where the one or more image parameter adjustments include adjustments to one or more of gamma, contrast, and brightness. The method further includes applying the one or more image parameter adjustments to the entire image.

With further regard to the method, in some implementations, in some implementations, the predetermined face criteria are based on other images of the same face. In some implementations, the one or more image parameter adjustments include adjustments to one or more white balance parameters. In some implementations, the method further includes applying the one or more image parameter adjustments to an entire frame or frames of a video stream.

In some implementations, a system includes one or more processors, and logic encoded in one or more tangible media for execution by the one or more processors. When executed, the logic is operable to perform operations including receiving an image, selecting a reference object in the image, determining one or more image parameter adjustments based on the selected reference object, and applying the one or more image parameter adjustments to the entire image.

With further regard to the system, in some implementations, the reference object is a face. In some implementations, to select the reference object, the logic when executed is further operable to perform operations including determining a foreground and a background of the image, and selecting the reference object from the foreground. In some implementations, the one or more image parameter adjustments meet predetermined face criteria. In some implementations, the one or more image parameter adjustments include adjustments to one or more of gamma, contrast, and brightness. In some implementations, the one or more image parameter adjustments include adjustments to one or more white balance parameters. In some implementations, the logic when executed is further operable to perform operations including applying the one or more image parameter adjustments to an entire frame or frames of a video stream.

DETAILED DESCRIPTION

Implementations described herein enhance content appearance. In various implementations, a system may enhance content in a social network system, or in anywhere visual media may be used and/or viewed. As described in more detail below, in various implementations, the system receives an image. For example, the image may be a photo or may be a frame of a video stream. As described in more detail below, implementations utilize a priori knowledge of a scene to enhance the appearance of an image and or video.

In some implementations, the system selects a reference object in the image. In various implementations, the reference object may be a face. In some implementations, when selecting the reference object, the system may determine the foreground and the background of the image, and then select the reference object from the foreground.

The system then determines one or more image parameter adjustments based on a priori knowledge of the selected reference object. In various implementations, the one or more image parameter adjustments meet predetermined face criteria. In some implementations, the predetermined face criteria may be based on other images of other faces. In some implementations, the predetermined face criteria may be based on other images of the same face. In various implementations, the one or more image parameter adjustments may include adjustments to gamma, contrast, and brightness, and adjustments to one or more white balance parameters.

The system then applies the parameter adjustments to the entire image. In various implementations, the system may apply the image parameter adjustments to an entire frame or frames of a video stream.

Figure 1:
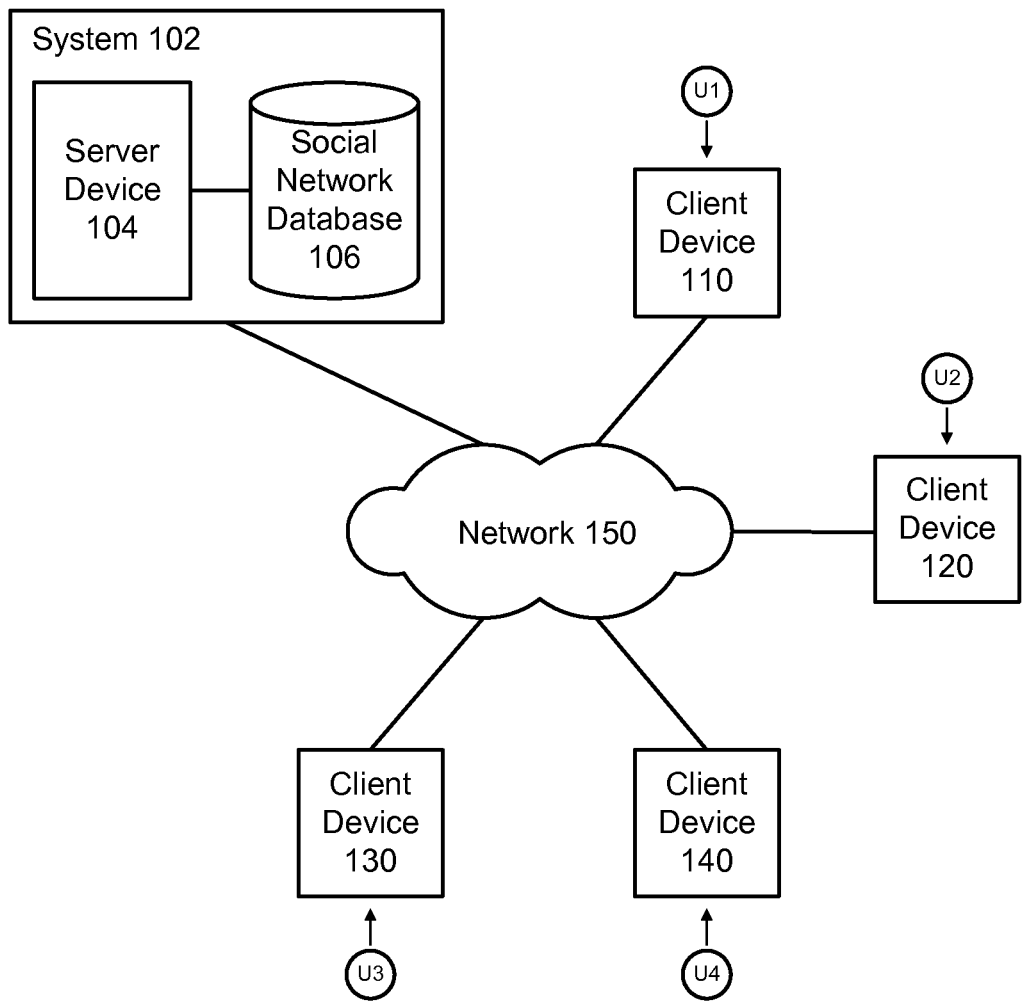
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit images and videos to each other. In various implementations, system 102 may enhance content in a social network system, or in anywhere visual media may be used and/or viewed.

Figure 2:
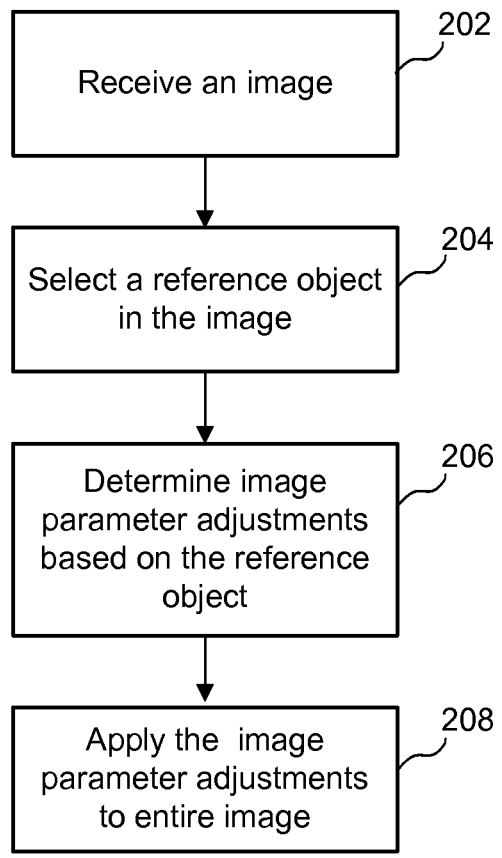
FIG. 2 illustrates an example simplified flow diagram for enhancing content appearance in a social network system, according to some implementations.

FIG. 2 illustrates an example simplified flow diagram for enhancing content appearance in a social network system, according to some implementations. Referring to both FIGS. 1 and 2, a method is initiated in block 202, where system 102 receives an image. In some implementations, the image may be a photo that system 102 receives when a user uploads the photo. In some implementations, the image may be a frame of a video stream that system 102 receives from a video camera of a user (e.g., during a multi-user video conference).

For ease of illustration, some implementations are described herein in the context of a single image. However, such implementations may also be applied to multiple images. For example, system 102 may receive multiple photos and/or multiple frames of a video stream. As such, system 102 may then apply the other steps of FIG. 2, described below, to multiple received photos and/or frames.

Figure 3:
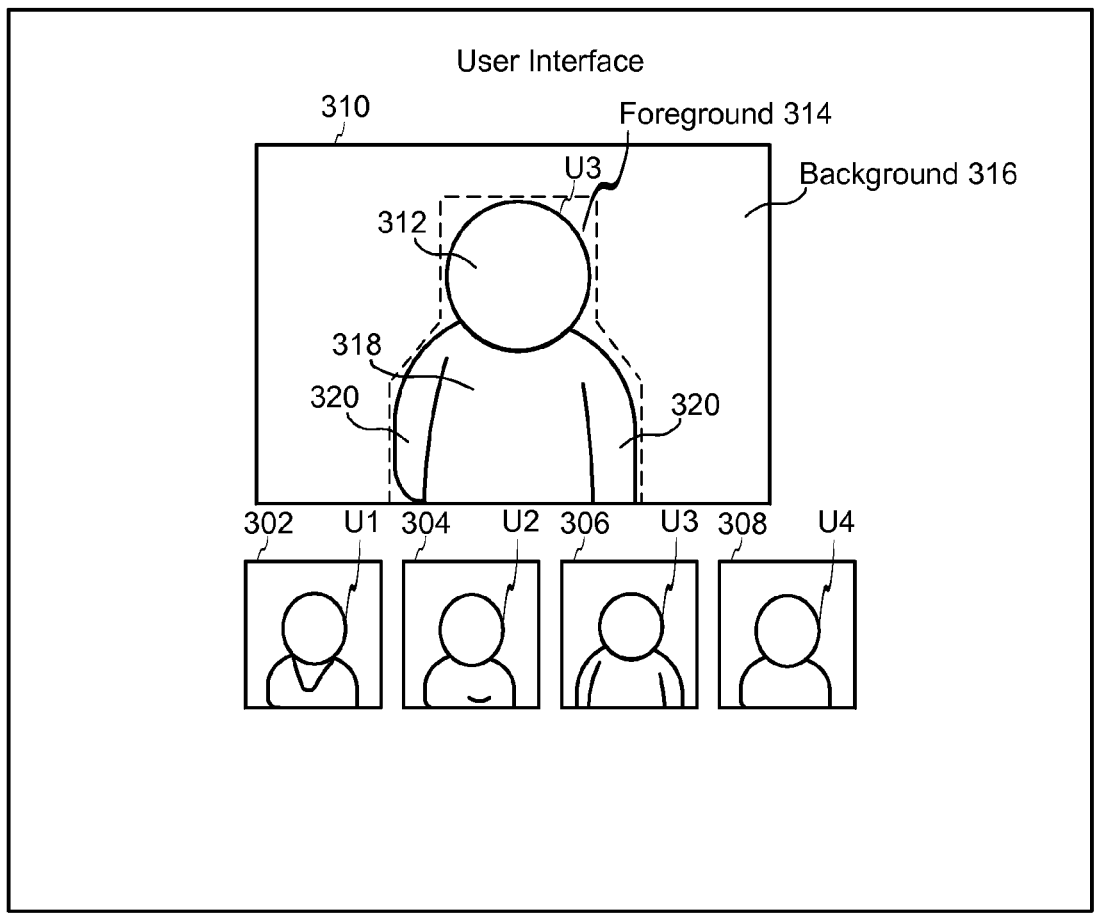
FIG. 3 illustrates an example user interface, according to some implementations.

FIG. 3 illustrates an example user interface 300, according to some implementations. As shown, in this example implementation, user interface 300 displays video windows 302, 304, 306, and 308, which display video streams of respective users U1, U2, U3, and U4 who are participating in the multi-user video conference. For ease of illustration, four users U1, U2, U3, and U4 are shown in this particular example. In various implementations, there may be various numbers of users participating in a multi-user video conference.

FIG. 3 also shows a main video window 310, which displays a video stream of user U3, who is currently speaking In various implementations, the video stream displayed in main video window 310 switches to a different video stream associated with another user each time a different user speaks. In the various implementations described herein, system 102 causes the elements described herein (e.g., images, frames, etc.) to be displayed in user interface 300 on a display screen.

Still referring to FIG. 2, in block 204, system 102 selects a reference object in the image. In various implementations, the reference object is a face. For example, system 102 may select the face 312 of user U3 in the image shown in main video window 310 of FIG. 3.

Note that the scope of the term "image" may vary, depending on the context. In some contexts, an image may refer to an entire photo or frame of a video stream. For example, in FIG. 3, an image may include face 312 in the foreground 314 (elements shown within the dotted lines) and may include a white wall in the background 316 (any elements shown outside the dotted lines). In this context, when an image refers to an entire photo or frame, the image may also be referred to as a "scene." In some contexts, an image may refer to an image of a particular object in a photo or frame. For example, a photo or frame may have an image of a face along with other images in a scene.

In various implementations, faces are optimal candidates for reference objects, because faces have a limited set of reasonable skin tones. Also, faces are likely to be in the foreground, especially in a video conference application. In video chat or video conferencing applications, it is common for a face to be present in the video and typically in the foreground.

In some implementations, to select a reference object, system 102 may determine the foreground and the background of the image, and then select the reference object from the foreground. For example, referring still to FIG. 3, system 102 may determine that the portions of the image in main video window 310 are in foreground 314 and portions are in background 316. Foreground 314 may include, for example, the user's face 312, upper torso 318, and arms 320 in foreground 314. Background 316 may include the remaining portions (e.g., a white wall) in main video window 310. System 102 may then select an object such as face 312 from foreground 314.

In various implementations, different methods may be used to determine the foreground and the background. In a video conference implementation, the foreground is likely to contain a person (e.g., the video conference participant), as described in the example above. As such, the foreground elements behave differently from the background elements. For example, a person in the foreground is most likely moving (e.g., taking, smiling, etc.), whereas the background elements (e.g., a wall, bookshelf, etc.) are most likely still. These properties may be used to distinguish between the foreground and the background.

In some implementations, system 102 may generate alpha values for an image in order to apply foreground/background segmentation. For example, system 102 may generate alpha values for different portions of an image, where portions or objects with values that meet an alpha value threshold (e.g., near or above 255) represent foreground, and where portions or objects with values that do not meet the alpha value threshold (e.g., near 0) represent background. In some cases, the alpha values on a face may be near 128, which may indicate indecision of the background/foreground segmentation algorithm. To resolve this indecision, system 102 may find the mean alpha value over the face in the scene, and then normalize the alpha values of the entire image such that the face has alpha values near 255.

In block 206, system 102 determines one or more image parameter adjustments based on the selected reference object. More specifically, system 102 may utilize a priori knowledge of the selected reference object to determine the image parameter adjustments. For example, as described in more detail below, system 102 may base the image parameter adjustments on known, predetermined ranges of image parameters (e.g., image parameters resulting in acceptable skin tone ranges for faces).

In some implementations, system 102 may ensure that the one or more image parameter adjustments meet predetermined criteria. For example, in some implementations, where the reference object is a face, system 102 may ensure that the one or more image parameter adjustments meet predetermined face criteria. Such predetermined face criteria may include ranges of image parameter values (e.g., values associated with gamma, contrast, brightness, etc.) that result in acceptable ranges skin tones.

In some implementations, the predetermined face criteria may be based on other images of other faces. For example, as indicated above, faces have a limited set of skin tones. As such, system 102 may determine ranges of reasonable image parameter values for various corresponding image parameters. These ranges of image parameter values provide acceptable skin tone ranges, and, thus, may be used to provide predetermined face criteria.

In some implementations, the predetermined face criteria may be based on other images of the same face. For example, system 102 may access historical data associated with other images of the same face. These other images may have optimal image parameter values for that particular face, and, thus, may be used to provide predetermined face criteria.

In various implementations, system 102 may utilize existing libraries of faces to detect faces in an image or in a video quickly and accurately. System 102 may use existing face criteria or may update face criteria as needed. Updating the face criteria over time will improve the reliability of the face criteria, especially for a particular face.

In various implementations, the a priori knowledge used to determine the image parameter adjustments may include information that system 102 accesses from a library of predetermined face criteria. In some implementations, the a priori knowledge may include information that system 102 accesses using a recognition algorithm. For example, where the reference object is a face, system 102 may identify the face, recognize the face, and then access stored, predetermined face criteria and/or generate new or updated face criteria associated with the particular face. Example recognition algorithms are described in more detail below.

In various implementations, system 102 may use a priori knowledge from previous images, previous frames or history within a video to inform future determinations of image parameter adjustments.

As indicated above, in various implementations, image parameters may include gamma, contrast, and brightness. As such, in various implementations, the one or more image parameter adjustments may include adjustments to gamma, contrast, and/or brightness. Other image parameters and associated adjustments are possible. For example, system 102 may adjust luminosity; chrominance; red, blue, green (RGB) colors; etc. Different combinations of image parameter adjustments provide different changes to the perception of the reference object (e.g., skin tone).

In various implementations, image parameters may also include white balance parameters. As such, in some implementations, the one or more image parameter adjustments include adjustments to one or more white balance parameters in order for the reference object (e.g., the face) to better meet the predetermined face criteria (e.g., to match known acceptable skin tones). The same process may be applied to other reference objects (e.g., hair) as well.

In various implementations, system 102 may measure the image parameters of the selected reference object, compare those measured image parameters to the predetermined face criteria, and then determine one or more image parameter adjustments accordingly.

In some implementations, system 102 may apply an optimization and/or heuristic function to evaluate the appearance of an object in the enhanced image. In some implementations, system 102 may search the various permutations of predetermined color transforms having corresponding image parameter adjustments to find the optimal color transform for the selected reference object. As indicated herein, the image parameter adjustments may be extrapolated to an entire image. By leveraging a priori knowledge of a scene, system 102 may validate and tune the predetermined color transforms, predetermined face criteria, etc.

In some implementations, system 102 may use the reference object for validation of color transforms allowing system 102 to make much more dramatic and/or more accurate enhancements to the image over time.

While various implementations are described in the context of the reference object being a face, the reference object may be other objects. For example, a reference object may be any object having associated a priori knowledge. For example, in a classroom scenario, where the image content may often include a white board or black board, system 102 may detect and verify that reference object using a recognition algorithm. System 102 may then use a priori knowledge associated with the reference object to calibrate image parameters adjustments, color transform, etc.

Referring again to FIG. 2, in block 208, system 102 applies the one or more image parameter adjustments to the entire image. In various scenarios, the reference object in the scene may serve as a reliable reference for calibration of an entire image and/or frames of a video stream. As such, system 102 may extrapolate the local image optimization of the selected reference object to the whole image or even to frames of a video stream. As indicated above, in various implementations, system 102 may apply the one or more image parameter adjustments to an entire frame or frames of a video stream. With a video stream/sequence, nearby frames often have similar video content. Accordingly, information obtained from frame N may be applied to frame N+1, etc. In some implementations, system 102 may apply the image parameter adjustments to all of the frames of a video.

In some implementations, system 102 may update corrections periodically after a predetermined time period (e.g., every minute). This enables system 102 to make appropriate adjustments (e.g., changes to image parameters adjustments, color transforms, etc.) as conditions change (e.g., if lighting changes, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize a variety of objects such as faces, landmarks, and other subject matter, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their photos for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in a photo, system 102 may compare the face (i.e., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the photo. In some implementations, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the photo to one more reference images with matching or similar features. In some implementations, system 102 may normalize multiple reference images, and compress face data from those images into a composite representation having information (e.g., facial feature data), and then compare the face in the photo to the composite representation for facial recognition.

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the photo matches a given reference image. In some implementations, the output may be represented as a metric (or numerical value) such as a percentage associated with the confidence that the face in the photo matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Implementations described herein provide various benefits. For example, implementations improve content appearance automatically without requiring manual supervision to get the desired results. Implementations, utilize a priori knowledge of a scene to serve in place of manual supervision and achieve automatic improvements. Implementations described herein also increase overall engagement among users in a social networking environment by providing higher quality images and video to users of the social network system.

Figure 4:
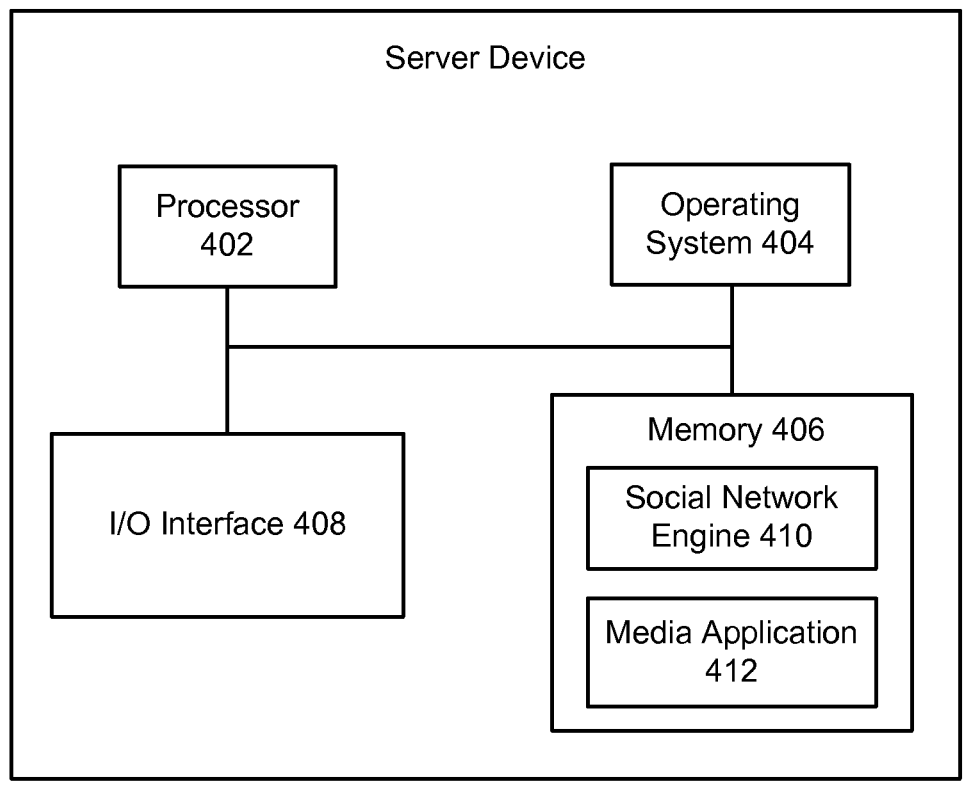
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. In some implementations, server device 400 includes a processor 402, an operating system 404, a memory 406, and an input/output (I/O) interface 408. Server device 400 also includes a social network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, social network engine 410, and media application 412. These blocks 402, 404, 406, 408, 410, and 412 may represent multiple processors, operating systems, memories, I/O interfaces, social network engines, and media applications. In other implementations, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
receiving an image that is a first frame in a video stream, wherein the first frame is located at any point in the video stream;
selecting a reference object in the first frame, wherein the reference object is a first face, and wherein the selecting comprises:
determining a foreground and a background of the image by comparison of the first frame to one or more other frames in the video stream to identify the reference object based on a relative position of the reference object in the first frame and in each of the one or more other frames; and
selecting the reference object from the foreground;
determining one or more image parameter adjustments to apply to the first face to modify a skin tone of the first face, wherein the one or more image parameter adjustments meet predetermined face criteria, wherein the predetermined face criteria is based on one or more other faces in the one or more other frames, and wherein the one or more image parameter adjustments comprise adjustments to one or more of gamma, contrast, and brightness; and
applying the one or more image parameter adjustments to the first face in the first frame.

2. The method of claim 1, wherein:
the predetermined face criteria is based on other images of the first face; and
selecting the reference object in the first frame further comprises analyzing at least one of a size of the reference object and a shape of facial features of the reference object.

3. The method of claim 1, wherein the one or more image parameter adjustments include adjustments to one or more white balance parameters.

4. The method of claim 1, further comprising applying the one or more image parameter adjustments to the one or more other frames in the video stream.

5. A method comprising:
receiving a first image that is a first frame in a video stream, wherein the first frame is located at any point in the video stream;
selecting a first face in the first frame by:
generating alpha values for the first frame;
applying foreground and background segmentation based on the alpha values to identify a foreground and a background; and
selecting the first face from the foreground;
determining one or more image parameter adjustments to apply to the first face to modify a skin tone of the first face based on a comparison of the first face to a reference image that includes a type of object corresponding to the first image, wherein the one or more image parameter adjustments comprise adjustments to one or more of gamma, contrast, brightness, luminosity, chrominance, red color, blue color, and green color; and
applying the one or more image parameter adjustments to the first face in the first frame.

6. The method of claim 5, wherein:
generating the alpha values for the first frame includes assigning a first alpha value of the alpha values to a first object in the first frame;

applying foreground and background segmentation based on the alpha values comprises determining that the first alpha value exceeds an alpha value threshold and that the first object is part of the foreground; and selecting the first face from the foreground includes determining that the first object is the first face.

7. The method of claim 5, wherein the comparison of the first face to the reference image includes a determination of a relative position of one or more facial features in the reference image to corresponding one or more facial features in the first face.

8. The method of claim 5, wherein the reference image is generated by compressing face data from a plurality of reference images into a composite representation and wherein the comparison of the first face to the reference image includes comparing the first face to the composite representation.

9. The method of claim 5, wherein the one or more image parameter adjustments meet predetermined face criteria, and wherein the predetermined face criteria is based on other images of other faces.

10. The method of claim 5, further comprising generating a likelihood that the first face in the first frame matches the reference image.

11. The method of claim 10, wherein generating the likelihood is based on performing facial recognition on the first frame.

12. The method of claim 5, wherein the one or more image parameter adjustments include adjustments to one or more white balance parameters.

13. The method of claim 5, further comprising applying the one or more image parameter adjustments to one or more other frames in the video stream that are similar to the first frame.

14. A system comprising:
one or more processors; and
logic encoded in one or more tangible media for execution by the one or more processors and when executed operable to perform operations comprising:
receiving a first image that is a first frame in a video stream, wherein the first frame is located at any point in the video stream;
selecting a first face in the first frame by:
generating alpha values for the first frame;
applying foreground and background segmentation based on the alpha values to identify a foreground and a background; and
selecting the first face from the foreground;
determining one or more image parameter adjustments to apply to the first face to modify a skin tone of the first face based on a comparison of the first face to a reference image that includes a type of object corresponding to the first image, wherein the one or more image parameter adjustments comprise adjustments to one or more of gamma, contrast, brightness, luminosity, chrominance, red color, blue color, and green color; and
applying the one or more image parameter adjustments to the first face in the first frame.

15. The system of claim 14, wherein:
generating the alpha values for the first frame includes assigning a first alpha value of the alpha values to a first object in the first frame;
applying the foreground and background segmentation based on the alpha values comprises determining that the first alpha value exceeds an alpha value threshold and the first object is part of the foreground; and
selecting the first face from the foreground includes determining that the first object is the first face.

16. The system of claim 14, wherein the comparison of the first face to the reference image includes a determination of a relative position of one or more facial features in the reference image to corresponding one or more facial features in the first face.

17. The system of claim 14, wherein the reference image is generated by compressing face data from a plurality of reference images into a composite representation and wherein the comparison of the first face the reference image includes comparing the first face to the composite representation.

18. The system of claim 14, wherein the logic when executed is further operable to perform operations comprising generating a likelihood that the first face in the first frame matches the reference image.

19. The system of claim 14, wherein the one or more image parameter adjustments include adjustments to one or more white balance parameters.

20. The system of claim 14, wherein the logic when executed is further operable to perform operations comprising applying the one or more image parameter adjustments to one or more other frames in the video stream that are similar to the first frame.

* * * * *

UNITED STATES PATENT AND TRADEMARK OFFICE
CERTIFICATE OF CORRECTION

PATENT NO. : 9,390,481 B2
APPLICATION NO. : 13/907890
DATED : July 12, 2016
INVENTOR(S) : Carpenter et al.

Page 1 of 1

It is certified that error appears in the above-identified patent and that said Letters Patent is hereby corrected as shown below:

In the Claims

In Column 12, Line 31, please delete "first face the" and insert -- first face to the -- therefor.

Signed and Sealed this
Seventeenth Day of March, 2020

Andrei Iancu
*Director of the United States Patent and Trademark Office*